United States Patent [19]
Elliott

[11] Patent Number: 5,108,691
[45] Date of Patent: Apr. 28, 1992

[54] COMPRESSING AND SHAPING THERMOFORMABLE MATS USING SUPERHEATED STEAM

[75] Inventor: George M. Elliott, Alpharetta, Ga.

[73] Assignee: Astechnologies, Inc., Roswell, Ga.

[21] Appl. No.: 274,573

[22] Filed: Nov. 23, 1988

Related U.S. Application Data

[63] Continuation-in-part of Ser. No. 903,191, Sep. 3, 1986, abandoned.

[51] Int. Cl.$^5$ .............................................. B29C 51/00
[52] U.S. Cl. ..................................... 264/554; 264/327; 264/101; 264/296; 264/345; 156/220; 156/245; 156/285; 156/311; 156/497; 156/498; 425/404; 425/446
[58] Field of Search ...................... 156/245, 285, 306.6, 156/313, 497, 498, 242, 196, 220, 321, 221, 311; 29/91; 264/546, 554, 101, 266, 293, 296, 345, 119, 348, 82, 321, 324, 327; 425/358, 404, 405.1, 446, 415; 428/160, 316.6

[56] References Cited

U.S. PATENT DOCUMENTS

| | | |
|---|---|---|
| 3,265,530 | 8/1966 | Marzocchi et al. |
| 3,280,237 | 10/1966 | Corbin et al. ................. 264/109 |
| 3,300,357 | 1/1967 | Doerfling . |
| 3,654,019 | 4/1972 | Cusick ........................... 156/285 |
| 3,867,240 | 2/1975 | Doerfling . |
| 3,891,738 | 6/1975 | Shen ............................... 264/101 |
| 3,911,186 | 10/1975 | Trotman ......................... 156/285 |
| 3,966,526 | 6/1976 | Doerfling . |
| 4,052,241 | 10/1977 | Walter ............................ 156/245 |
| 4,077,821 | 3/1978 | Doerfling . |
| 4,107,829 | 8/1978 | Urai et al. ..................... 156/196 |
| 4,119,749 | 10/1978 | Roth et al. .................... 428/160 |
| 4,124,421 | 11/1978 | Fujii .............................. 156/221 |
| 4,150,850 | 4/1979 | Doerfling . |
| 4,260,575 | 4/1981 | Thew et al. .................. 156/321 |
| 4,274,901 | 6/1981 | Elber ............................. 156/285 |
| 4,313,776 | 2/1982 | Urai et al. .................... 156/220 |
| 4,327,049 | 4/1982 | Miller ............................ 428/316.6 |
| 4,379,101 | 4/1983 | Smith ............................ 264/119 |
| 4,385,955 | 5/1983 | Doerfling et al. . |
| 4,409,170 | 10/1983 | Stofko .......................... 264/113 |
| 4,469,655 | 9/1984 | Kiss ............................... 264/82 |
| 4,692,199 | 9/1987 | Kozlowski et al. ............ 156/245 |
| 4,718,153 | 1/1988 | Armitage et al. .............. 29/91 |
| 4,786,351 | 11/1988 | Elliott et al. ................ 156/500 X |
| 4,795,517 | 1/1989 | Elliott et al. .................. 156/242 |
| 4,964,936 | 10/1990 | Ferro ............................. 156/242 |

FOREIGN PATENT DOCUMENTS

| | | |
|---|---|---|
| 04118 | 7/1987 | World Int. Prop. O. . |
| 07557 | 12/1987 | World Int. Prop. O. . |
| 01565 | 3/1988 | World Int. Prop. O. . |

OTHER PUBLICATIONS

Thermodynamics–Black et al., Chapter 2, Harper & Row, 1967.
Am. Heritage Dictionary (2nd Ed. © 1982), p. 771.

Primary Examiner—Michael W. Ball
Assistant Examiner—Mark A. Osele
Attorney, Agent, or Firm—Sutherland, Asbill & Brennan

[57] ABSTRACT

A thermoformable mat, e.g., a mat of resinated fiberglass, is compressed and shaped into a contoured object, e.g., a shell for an automobile headliner, by this process. The mat is compressed between two dies that have been preheated. At least one of the dies is perforated. Superheated steam (e.g., at 80 psig and 600° F.) is ejected from the perforations into the mat, thereby quickly raising the mat temperature to its thermoforming point. After the mat is set into the contoured shape, the dies are reopened and the formed mat is removed. If the mat that is used contains a thermoplastic adhesive, the mat is cooled to below the adhesive's melt print before the dies are opened. This can be done by applying a vacuum to the perforated die and pulling ambient air through the mat.

44 Claims, 4 Drawing Sheets

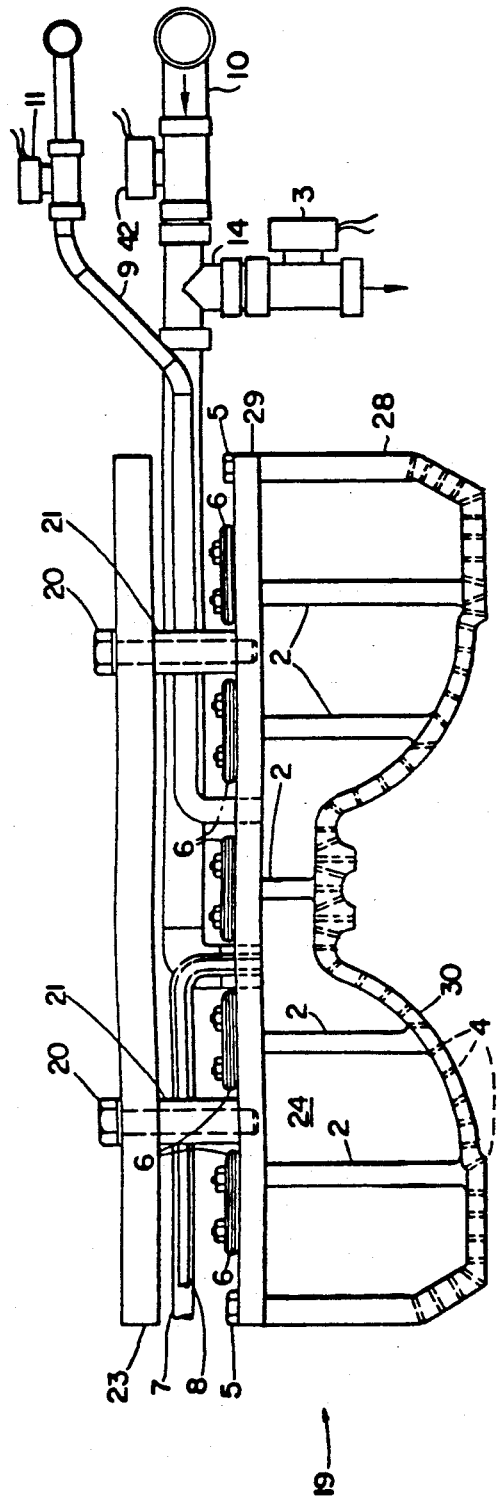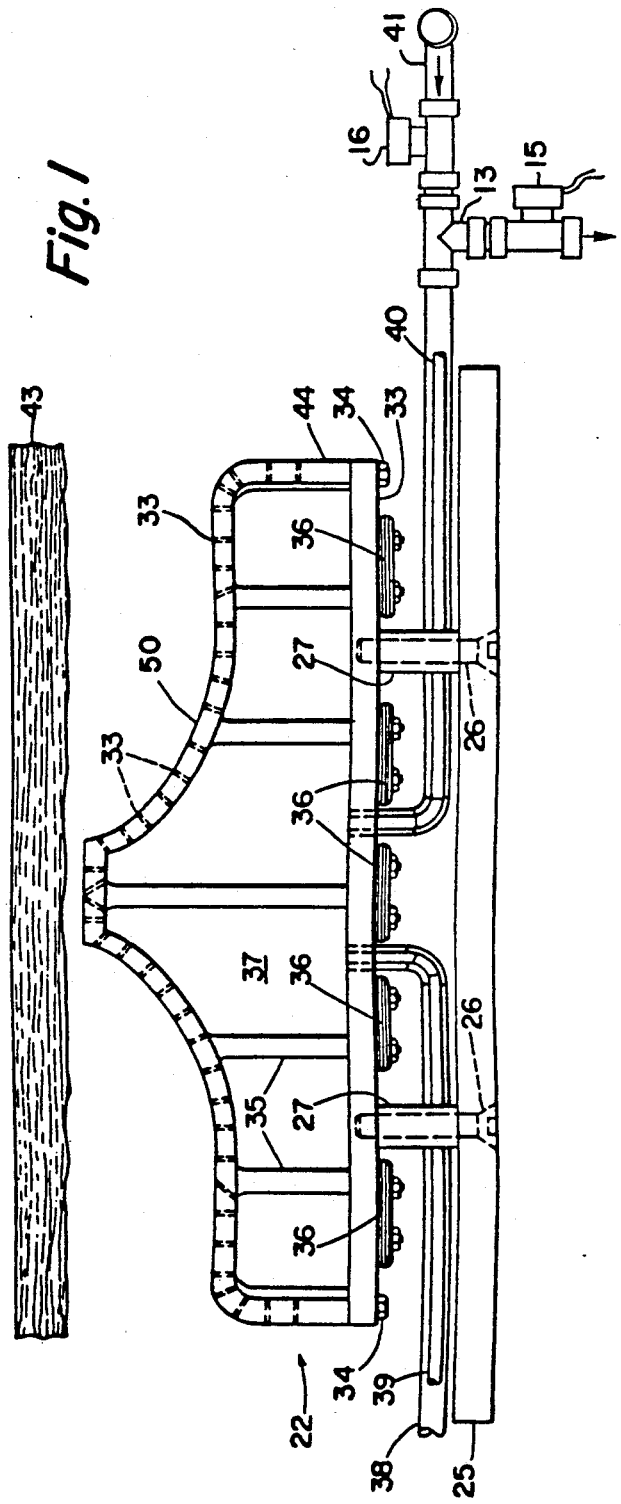
Fig.1

COMPRESSING AND SHAPING THERMOFORMABLE MATS USING SUPERHEATED STEAM

This application is a continuation-in-part of Ser. No. 903,191, filed Sept. 3, 1986, now abandoned.

This invention concerns a process of shaping, by application of heat and pressure, a porous, thermoformable mat, into a contoured sheet. The process may be used to produce a contoured insulating sheet made of fibrous material or open-cell foam, e.g., randomly oriented glass fibers bound together with a phenol-formaldehyde resin. In particular, the invention is directed to a process for forming such a product by passing pressurized superheated steam through the mat and compressing the mat between preheated dies.

Contoured sheets formed of fibrous or cellular material rigidified by a resinous binder find use in a variety of applications. A conventional method of forming such sheets is by compressing and heating between two mold halves a porous, thermoformable mat of fibrous or cellular material that is intermixed with a heat-activatable adhesive. In transportation vehicles such products are used as the shell or substrate for interior trim panels (including headliners), floor pads, hood liners, and enclosures or covers for various engine parts, including rocker covers, front covers, dust covers, and undercovers. The contoured sheets are often used to insulate against sound or heat, or both. Methods of forming such products are disclosed in U.S. Pat. No. 4,327,049 to Miller, U.S. Pat. No. 4,379,101 to Smith, U.S. Pat. No. 4,385,955 to Doerfling et al., and U.S. Pat. No. 4,466,848 to Ogawa.

The forming method disclosed in Miller (U.S. Pat. No. 4,327,049) uses a mat composed of laminated layers of cellular thermoplastic materials, e.g., polystyrene and polyurethane foams, and fabric. The mat is heated to its softening point and then compressed between heated mold halves. While the mold halves are in their fully closed position, a cooling fluid is circulated through the mold halves to reharden the mat. Then the mold is opened and the finished contoured sheet is removed. Neither mold half is perforated, and no steam is passed through the mat.

The process disclosed in Smith (U.S. Pat. No. 4,379,101) uses a mat composed of waste textile fibers with a heat-activable adhesive dispersed throughout. The mat is compressed between perforated dies that have been preheated. Smith ejects hot humid air into the mat from the perforations in the top die. The source of Smith's hot humid air is the combination of a blower that forces cool, ambient air into a flexible duct, with a smaller steam line that opens inside the duct. The steam is delivered at a very low pressure (about 2 to 10 psig) and is at a temperature of about 350° to 500° F. The ratio of air to steam changes during the process. For the first three seconds the air volume is high and the steam volume is low. Then the air volume is reduced and the steam volume is increased, raising both the temperature and the humidity of the air injected into the workpiece. This ratio is held constant for about ten seconds; then the steam is turned off, causing the workpiece to be cooled by the continued flow of ambient air through it. Because Smith's steam line opens inside the air duct, his steam pressure cannot exceed the air pressure. If it does, the steam will escape from the machine as blowback through the fan. Smith's fan provides a pressure generally of the order of 20 inches of water. This equals only 0.72 psig. The process, therefore, relies primarily on conductive heat, since relatively little heat energy is delivered to the mat by the low pressure hot air.

The process disclosed by Doerfling et at. (U.S. Pat. No. 4,385,955) involves the compression of a mat of resinated fiberglass between heated contoured dies. Typical die temperatures are in the range of 400° to 550° F. Neither die is perforated, and no steam is passed through the mat.

The method disclosed in Ogawa (U.S. Pat. 4,466,848) forms a laminate of a resinated fiberglass mat, a film of impermeable thermoplastic resin, an unvulcanized rubber sheet, and, optionally, a top layer of a decorative fabric over the rubber. The laminate is compressed between an upper die that has been preheated to a temperature of about 140°–170° C. and a lower die that has been preheated to a temperature of about 150°–230° C. Neither die is perforated, and no steam is passed through the mat.

One of the most important factors in thermoforming such mats is the residence time in the mold. The quicker the mats can be formed and released from the mold, the lower the production cost. I have invented a novel process, using apparatus disclosed in certain co-pending patent applications, that can shorten the mold residence time significantly, without damage to the product. My process involves the following steps:

placing the mat between a pair of complementary, contoured dies, at least one of which has a perforated contact surface and an enclosed chamber behind the contact surface, both dies being preheated to an elevated temperature;

introducing superheated steam into the die chamber, the steam being at a pressure and temperature sufficient to heat the mat to its thermoforming temperature;

bringing the dies fully together, thereby compressing the mat, while the mat is at its thermoforming temperature;

halting the steam introduction;

maintaining the die pressure on the mat until the mat is substantially completely thermoformed;

separating the dies; and removing the formed product.

The present process is especially useful in preparing contoured insulating sheets wherein the thickness varies substantially from one area to another, i.e., the clearance between the dies is not uniform. Automobile headliner shells are a good example. They usually are thicker in the center than at the edges. This makes them denser and stronger around their periphery, where they are fastened to the automobile body, but without significant sacrifice of insulating effectiveness. Also, the thinner edges facilitate the application of decorative trim or the overlap of side panels.

A variety of substrate materials can be used to construct the mat employed in the present process. Both natural and synthetic materials can be used. The process has been used successfully with both fibrous mats and cellular mats.

Glass fibers are commonly used in thermoformable mats and often are preferred. Textile waste, known as "shoddy", also can be used. Blends of different fibers can be used as well. Preferably, the fibers either will be loosely woven or nonwoven, e.g., randomly oriented.

Open-cell foam, e.g., made of polyurethane or polyolefin, sometimes is used as the substrate material in thermoformable mats as well. For added strength, the foam can be reinforced with a fibrous filler, such as chopped fiberglass.

If desired, the mat can be prelaminated, on one or both sides, to a porous web material, e.g., a reinforcing scrim or a decorative fabric.

Usually the mat will have a substantially uniform thickness, often in the range of about ¾ to 2 inches. It must be porous enough to allow the steam to pass through it. A preferred density for fiberglass mats is about 1½ to 2½ pounds per square yard. The mat is typically flexible, and at least somewhat resilient, prior to being formed by the process of the present invention. After being thermoformed, the mat is dimensionally stable and generally less resilient and less flexible.

Most, if not all, thermoformable mats in commercial use today are comprised of a substrate material intermixed with a heat activatable adhesive. Such mats are commercially available stock material and are disclosed, for example, in U.S. Pat. No. 3,025,202, which is incorporated herein by reference. The adhesive is one which is capable, upon being activated and then set, of holding the substrate material in a contoured shape. I am aware, however, that some thermoformable mats have recently been developed that do not depend on an adhesive to hold their shape after being thermoformed. These are mats composed of open cell thermoplastic foam that softens if heated to a high enough temperature, so that it then can be shaped by compression between corresponding dies. These mats contain no adhesive.

If a heat-activatable adhesive is intermixed with the substrate material, any of various chemicals can be used for that purpose, provided the chemical has an activation temperature which is below the temperature at which the substrate in the mat melts or degrades. Usually the adhesive will be comprised of one or more synthetic resins. Examples are polyamide resins, polyester resins, polyurethane resins (both polyether-based polyurethanes and polyester-based polyurethanes), polyolefin resins, and the phenolic resins.

Both thermoplastic and thermosettable adhesives can be used. A thermosettable adhesive is one which solidifies, or sets, when heated to its activation temperature, and which cannot be remelted. Thermosettable adhesives often are resinous mixtures that are solid at room temperature, but which, when heated sufficiently, become molten for a short time and then undergo a cross-linking reaction that causes them to solidify permanently. A thermoplastic adhesive is normally solid and melts at its activation temperature, then resolidifies when cooled. Thermoplastic adhesives can be remelted. Phenolformaldehyde resins, which are thermosettable, are often preferred.

The activation temperature of the adhesive usually will be above about 180° or 200° F. and below about 375° or 350° F. Most often it will be in the range of about 230° to 350° F. For a thermoplastic adhesive the activation temperature is its melt point. For a thermosettable adhesive the activation temperature is its curing temperature, i.e., the temperature at which it will become thermoset.

Some heat-curing adhesives require moisture to become set. Mats comprising these adhesives can be thermo-formed using the present process as well. Some polyurethane adhesives, such as Bostik No. 9601, are moisture curing. They are solids at room temperature and have about the same consistency as paraffin wax. Usually these adhesives melt somewhere in the range of about 150° to 200° F. and then react with any moisture that is present, for example in the air, to cross-link and become set.

The adhesive can be mixed in with the fibrous or cellular material in any of a variety of ways. For example, glass fibers can be sprayed with a solution of an uncured phenol-formaldehyde resin as the fibers fall in a random arrangement and collect to form a web on a traveling conveyor. Alternatively, a thermoplastic adhesive in fibrous form can be mixed in with other fibers having a higher melting point. Thus, for example, polypropylene fibers can be blended in with higher melting polyester fibers; then, when the mat is subjected to the heating step, the polypropylene will soften and melt. After the mat is cooled, the polypropylene will resolidify, bonding the polyester fibers into a rigid or semi-rigid sheet.

The dies used in the process, when brought fully together, define in the space between them the desired shape of the formed mat. Preferably, both dies have perforated contact surfaces with enclosed chambers behind those surfaces and each chamber is connected to a valved source of superheated steam.

Apparatus that can be used to perform the present process are disclosed in U.S. patent application Ser. No. 832,514, filed Dec. 31, 1985 ("Process and Apparatus for Simultaneously Shaping Foam and Laminating Fabric Thereto") now U.S. Pat. No. 4,723,487 and Ser. No. 870,971 filed Jun. 5, 1986 ("Apparatus and Process for Shaping and Covering Cushion Foam"), now U.S. Pat. No. 4,795,517 both of which are incorporated herein by reference. In these apparatus, each die has an enclosed chamber, or cavity, behind its contact surface. This cavity is in communication with a valved source of superheated steam and with the perforations in the die. Also, the cavity in at least one of the dies preferably is in communication with a valved source of vacuum which can be drawn through the perforations in the die. The opposite die preferably has an air vent to the chamber, that can be opened or closed.

Both dies should be preheated prior to being pressed against the mat. That is, they should be brought to above room temperature. The preferred means of preheating the dies is by use of electrical resistance heaters. Precisely how hot the dies should be depends upon the forming temperature of the mat and, if it contains an adhesive, whether the adhesive is thermoplastic or thermosetting. When using a thermoplastic adhesive the dies preferably will be preheated to a temperature near, but below, the melt point of the adhesive, e.g., within about 50 Fahrenheit degrees of the melt point. This facilitates activation (i.e., melting) of the adhesive in the shortest possible time, but still allows the adhesive to resolidify after the steam injection ceases, while the mat is still compressed between the dies.

With thermosetting adhesives it is not necessary to keep the die pre-heat temperature below the activation temperature of the adhesive. By its very nature the adhesive will solidify (i.e., "set") while the mat is compressed between the high temperature dies. Indeed, it is possible to use conductive heat alone, from the hot dies, to form a mat that is impregnated with a thermosetting resin. As indicated above, such a method often is used in the prior art, without passing any heated vapors through the mat. In such processes, cycle times can be shortened by raising the die temperature to well above the cure temperature of the adhesive. For example, when using a thermosettable adhesive having a cure temperature of, say, about 325°–350° F., the dies can be preheated to as high as about 450°–550° F. to minimize cycle time. There are two principal disadvantages in using such high die temperatures, however: Over-curing and degradation of the surface of the mat can occur, and the finished sheet is so hot when the dies are opened, the machine operator is subjected to increased discomfort and risk of injury. Also, if the mat has been prelaminated to a web material, e.g., a reinforcing scrim, use of such high die temperatures can cause delamination.

Another problem with using high die temperatures is that at times they will cause a skin to be formed on the mat, which prevents fumes from the cured or partially cured resin from being completely released during the forming process. The fumes will continue to be slowly released long after the part is formed. Sometimes these vapors are potentially harmful and their release, for example inside an automobile, can be dangerous.

While, in the example given, use of a die temperature of only 350° F. would largely avoid these problems, that would be at the expense of a much longer cycle time. For example, whereas use of a die temperature of 500° F. might provide a cycle time of only 90 seconds (but with some surface degradation of the product), use of the safer temperature of 350° F. would extend the time considerably, for example to as long as six to ten minutes.

By virtue of the use of the combination of preheated dies and the injection of superheated steam into the mat, the present process can achieve relatively short cycle times (e.g., 30 to 60 seconds) without surface degradation. Also, the formed product can be cooled before the dies are opened, thereby lessening the discomfort and risk to the operator. In addition, skin formation on the mat can be avoided, and still the process can be performed at cycle times that are only 10 to 50% as long as those for existing conductive heat processes.

Therefore, when a thermosetting adhesive is used in the present process, the die preferably will be preheated to approximately the same temperature as the activation temperature of the adhesive, e.g., within about 25 Fahrenheit degrees of the activation temperature.

The perforations in the contact surface of each die should be relatively small, e.g., having diameters in the range of about 0.035 to 0.065 inch. There should be enough of the perforations, and they should be spaced closely enough together, to ensure relatively uniform heating of the mat. The smaller the perforations, the closer together they should be. Generally, the perforations should be spaced apart a distance not more than about ½ or 5/8 inch.

Superheated steam is steam that has been heated to a higher temperature than the saturation temperature corresponding to its pressure. As steam is formed in a boiler it is saturated, regardless of the pressure at which the boiler is operated. To superheat the steam requires that it be removed to a separate vessel, in which no water is present, and the steam be heated to a still higher temperature, while holding its pressure relatively steady. Thus, for example, 80 psig steam from a boiler is at a temperature of about 325° F. (its saturation temperature). If that steam is piped into a superheater designed to hold the pressure at about 80 psig, and the steam is there heated to 375° F., the steam then will be at a temperature that is approximately 50 Fahrenheit degrees higher than the saturation temperature corresponding to the pressure of the steam.

In the present process the temperature, pressure, flow rate, and duration of the introduction of the superheated steam into the die chamber are to a certain extent interrelated. A combination of these conditions should be selected which will heat the mat to its forming temperature. Generally, a steam temperature in the range of about 350 to 750° F. and a pressure of at least about 30 or 40 pounds per square inch gauge (psig) will be suitable. (This is as measured on the upstream side of the valve supplying the chamber. Some cooling and loss of pressure occurs as the steam enters the relatively unconfined space of the die chamber.) Usually, it will be preferred that the steam have a temperature in the range of about 350 to 650° F. and a pressure of about 90 psig or less, e.g., about 75 to 90 psig.

In the present process it generally will be preferred that the steam introduced to the die chamber be at a temperature that is at least about 100 Fahrenheit degrees higher than the saturation temperature corresponding to the pressure of the steam. (Again, this is as measured on the upstream side of the valve supplying the chamber.) If a thermosettable adhesive is in the mat, preferably the steam temperature will be at least about 100 Fahrenheit degrees higher than the temperature at which the adhesive will become thermoset. If a thermoplastic adhesive is used in the mat, preferably the steam temperature will be at least about 100 Fahrenheit degrees higher than the melt point of the adhesive.

Steam of the same temperature and pressure can be sent to the land areas as that sent to the die's protruding sections, or the two zones can be supplied with separate sources of steam, at different temperatures and/or pressures. The steam temperature will drop as the steam passes through the holes in the contact surface of the die, if the die is at a lower temperature. The temperature will drop less when passing through the holes in the protruding sections, however, if those sections are preheated to a higher temperature than the land areas. Therefore, although a single source of superheated steam may be used, the steam that enters the thicker regions of the mat may be supplied at a significantly lower temperature than that which is injected into the more compacted regions, provided the protruding sections are preheated to a higher temperature than the land areas. Also, separate sources of superheated steam can be used if desired: one for the land areas and another for the protruding sections.

The superheated steam may optionally be mixed with hot air, e.g., air having a temperature in the range of about 350° to 650° F., to help drive the steam into the interior of the mat. Again, this temperature is as measured on the upstream side of the valve supplying the air to the chamber. Preferably, if hot air is mixed with the superheated steam, it will be supplied at a temperature at least as high as that of the steam, and at substantially the same pressure as the steam.

When a mat containing a moisture-curing adhesive is formed by the present process, it may be desired to increase the moisture content of the superheated steam before it is passed into the mat. This can be done, for example, by also introducing saturated steam (sometimes referred to as "plant steam") to the die chamber to mix with the superheated steam. It may be preferred, however, to mix in saturated steam only during the first few seconds of the cycle, to better activate the adhesive, and then cut off the saturated steam and use only the superheated steam during the remainder of the cycle.

Often, however, it will be preferred to introduce only undiluted superheated steam to the die chamber. This is especially true when using thermoplastic adhesives and thermosetting adhesives that are not moisture-curing.

The duration of the steam injection must be long enough to assure that substantially all zones of the mat are at thermoforming temperature. If a mat that includes a heat-activatable adhesive is used, the adhesive should be fully activated.

Preferably, the introduction of the superheated steam to the die chamber commences before the dies have been brought fully together. The dies may be gradually brought together as the steam is passing through the perforations in the contact surface and is penetrating the mat. Compression of the dies against the mat can be commenced either before or after the adhesive is substantially activated. It must be commenced, however, before the adhesive has completely set.

To facilitate the penetration of the steam into the mat, it is preferred that a vacuum simultaneously be pulled on the opposite side of the mat. To do this both dies should have perforated contact surfaces, one die should be connected to a superheated steam line, and the other die should be connected to a vacuum line. The volume of the vacuum applied to the one die should not exceed the volume of the steam introduced to the other; otherwise, cool surrounding air might be pulled into the mat through its edges.

When forming mats that are relatively thick or dense to begin with, it often will be preferred to reverse the direction of steam flow through the mat after a time, to assure uniform heating of the mat. This can best be done by using a pair of dies in which each is connected to a superheated steam line and a vacuum line. By opening and closing the various valves controlling the flow through the four lines, the direction of the steam flow can quickly and easily be reversed.

After the mat has been brought to thermoforming temperature and the dies have been brought fully together, the mat must be allowed to set in its contoured shape before the dies are separated. For mats that contain thermosettable adhesives this means maintaining the mat at cure temperature until the adhesive has become thermoset. For mats that contain thermoplastic adhesives it is required to halt the steam flow and allow the adhesive to cool and resolidify. For thermoformable foam mats that contain no adhesive, it is also required to halt the steam flow and allow the mat to cool and resolidify, before opening the dies.

To help cool the mat while it still is compressed between the dies, it is preferred to pass a cooling gas through it, such as ambient air. One way to do this is to use a vacuum.

While the mat is between the fully closed dies, usually at least a portion of it can be exposed to the ambient air. The edges of the mat, for example, will usually protrude from between the dies. Also, the chamber of at least one of the perforated dies can be in communication with an air vent that can be opened or closed. When it is desired to expose the mat to the air, that vent can be opened and all steam and vacuum to that chamber turned off.

Thus, either by allowing edges to protrude from the die or by opening an air vent to one of the dies, at least a portion of the mat can be exposed to the air. Then, by applying a vacuum to the appropriate die chamber, or chambers, the ambient air can be pulled into the mat in that region and drawn through the mat, thereby cooling it. Sometimes the edges of the thermo-formed mat will be so compressed that air can hardly be drawn through them. In that case the cooling step can be shortened considerably by opening the air vent to one of the dies and applying a vacuum to the opposite die.

Another way of passing air through the hot mat is to connect a fan to the chamber in one of the perforated dies and blow air out the perforations and into the mat. Here again, the chamber of the opposite die should be equipped with air vents that are kept open while the fan is on.

Even though it may be unnecessary, when a thermosettable adhesive is used, to cool the mat before separating the dies, it is preferred to do so for reasons of operator safety and comfort.

Another reason for applying a vacuum to one of the die chambers during the thermoforming process is to remove unwanted moisture and chemical vapors from the mat. After delivering its heat to the interior of the mat, the cooled steam will condense and make the mat wet, if not removed. Many thermosetting resins release noxious vapors when heated to activation temperature. Formaldehyde vapors, for example, usually are released when a phenol-formaldehyde resin is used.

In the present process, if the dies are disposed horizontally and vacuum is pulled on the bottom tool while superheated steam is ejected from the top tool, any molten adhesive present in the mat will migrate toward the bottom surface of the mat. This often results in a smoother, harder finish on the bottom surface of the sheet, which may be preferred. Such a finish normally will be preferred, for example, if the sheet is to have a decorative fabric laminated to it. Such lamination can be performed either in a separate operation or, in some instances, simultaneously with the thermoforming of the mat. But thermosetting resins generally require cure temperatures that are so high they will damage most decorative fabrics. If one wants to simultaneously laminate a decorative fabric to the surface of the contoured sheet, it is better to use a mat is which a thermoplastic adhesive is dispersed in the substrate material.

For a fuller understanding of the process of the present invention, reference is made to the drawings that accompany this specification. Referring to those drawings:

FIG. 1 is a front view, in partial cross-section, of a set of complementary dies about to be compressed against a resin-impregnated fiberglass mat that is to be formed into an under-carpet insulating sheet to fit over the transmission tunnel in a van.

Figure 2:
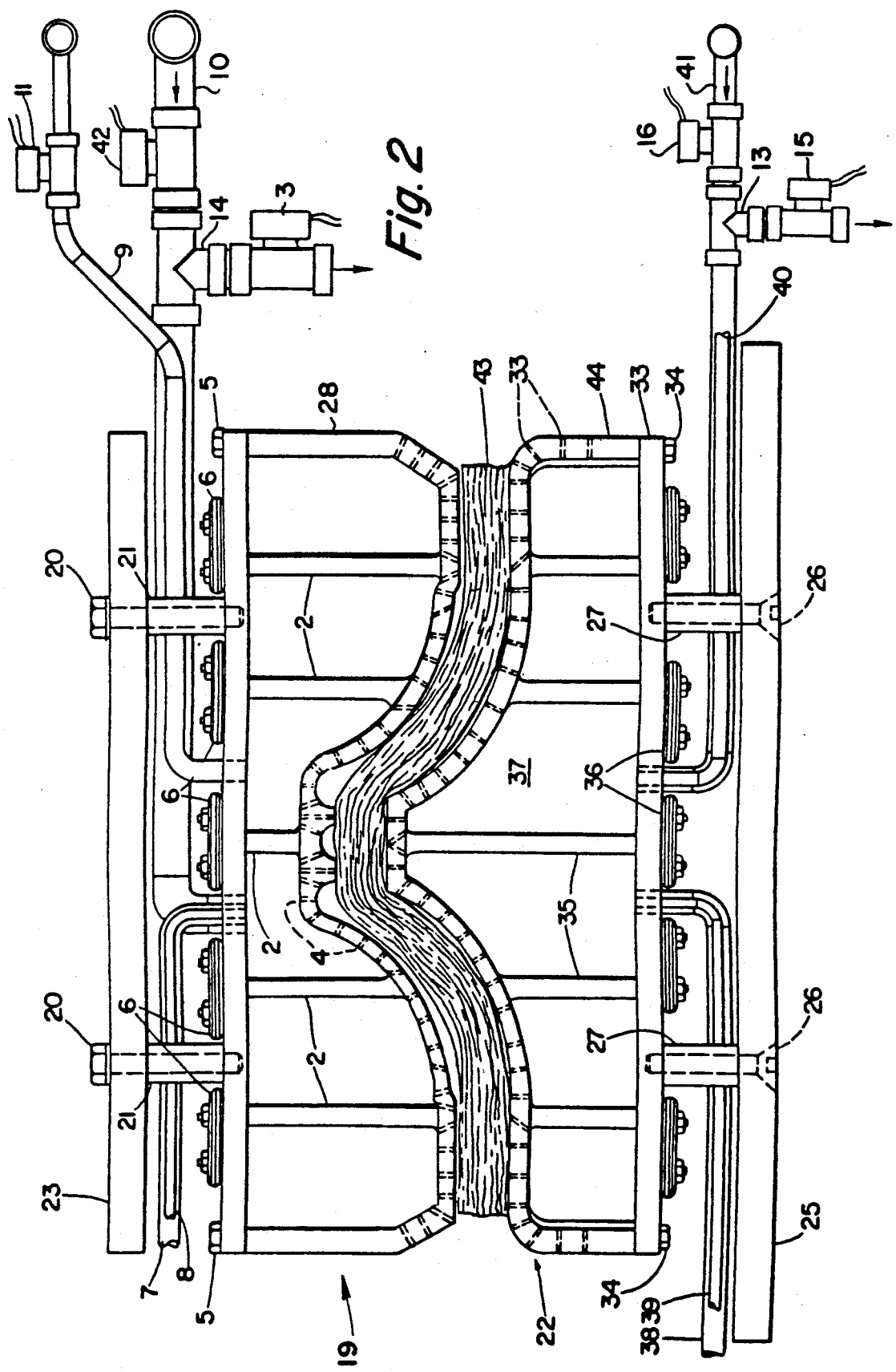
FIG. 2 is a cross-sectional view, slightly enlarged, of the same dies and mat as shown in FIG. 1, but with both die surfaces contacting the mat at the beginning of the compression step.
Figure 3:
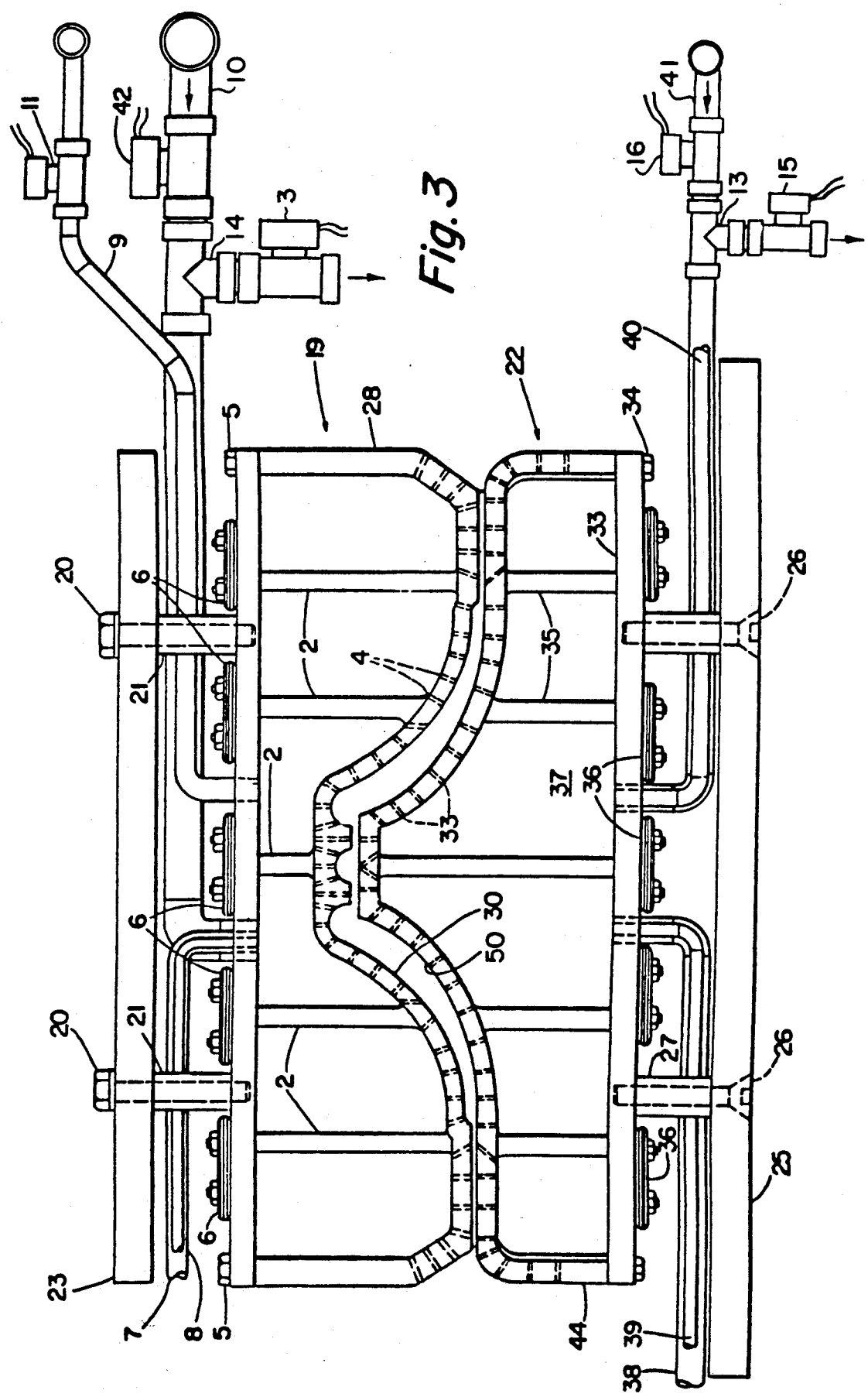
FIG. 3 shows the same dies as in FIGS. 1 and 2, enlarged still further, but without the mat, and with the two dies brought fully together.

The apparatus shown in FIGS. 1–3 of the drawings includes an upper die 19 and a lower die 22. Upper die 19 is held to die holding plate 23 by hex head bolts 20. Spacer collars 21 hold plate 23 and die 19 apart, so as to leave room for flexible piping that communicates with the interior cavity 24 of die 19. Lower die 22 is similarly held to plate 24 by flat head bolts 26. Spacer collars 27 hold plate 25 and die 22 apart. Die holding plates 23 and 25 are mounted on a frame (not shown) so that plate 23 and the mechanism attached thereto can be raised and lowered into engagement with lower die 22. More detailed disclosures of such apparatus may be found in the aforementioned U.S. patent applications Ser. Nos. 832,514 now U.S. Pat. No. 4,723,487 and 870,971 now U.S. Pat. No. 4,795,517.

Upper die 19 is comprised of a cast aluminum forming tool 28 with a detachable cover plate 29. Cover plate 29 is held to forming tool 28 by bolts 5, which are threaded into holes (not shown) in the periphery of tool 28. Internal posts 2 provide structural stability for upper die 19 and efficient heat transfer from electrically heated cover plate 29. Each post 2 is integral with the forming tool 28. None of the posts 2 extends the entire distance from the front to the back of die 19; therefore, chamber 24 is one continuous chamber, rather than a series of isolated compartments. The contact surface 30 of forming tool 28 is perforated. The preferred size and spacing of the holes 4 will vary according to the thickness and density of the mat used, as well as its composition. In the apparatus shown in the drawings, holes 4 are on a ¼-inch grid and have a diameter of 0.060 inch.

Attached to the top of cover plate 29 are five electrical resistance heaters 6. Each of these heaters has a rated capacity of 25 watts per square inch of contact surface. Four lines are tapped into chamber 24 through cover plate 29. Line 7 carries hot air. Line 8 carries saturated steam. Line 9 carries superheated steam. Line 10 pulls a vacuum. Flow in each of these lines is controlled by a solenoid valve. Valve 11 controls superheated steam line 9. Valve 42 controls vacuum line 10. (The valves controlling lines 7 and 8 are not shown.) Line 14, which branches from line 10, vents to the air. It is regulated by solenoid valve 3.

Lower die 22 is comprised of a cast aluminum forming tool 44 having a perforated contact surface 50. The holes 33 also are on a ¼-inch grid and have a diameter of 0.060 inch. They cover the entire contact surface 50. Forming tool 44 is held to cover plate 33 by a series of hex head bolts 34 around the periphery of plate 33. Vertical posts or ribs 35, which are integral with the forming tool 44, serve to strengthen lower die 22 and aid in the transfer of heat from electrical resistance heaters 36 to the contact surface 50. The enclosed chamber 37 between contact surface 50 and coverplate 33 is in communication with four pipes that ar tapped through coverplate 33. Line 38 supplies hot air; line 39 supplies saturated steam; line 40 supplies superheated steam; and line 41 supplies a vacuum. The flow in each of these lines is controlled by a solenoid valve (not shown for lines 38, 39, and 40). Solenoid valve 16, for example, controls the flow in vacuum line 41. Line 13, which branches from line 41, vents to the air. It is regulated by solenoid valve 15.

As shown in FIG. 1, a mat 43 of randomly oriented lass fibers, impregnated with a theromosettable phenol-formaldehyde resin, is placed between upper die 19 and lower die 22. The contact surface 30 of die 19 is preheated by use of electrical heater 6. The contact surface 50 of lower die 22 is preheated by use of electrical heaters 36. As shown in FIG. 2, upper die 19 is lowered toward lower die 22, bending mat 43 in the process. In FIG. 3, upper die 19 is lowered still further, to its fully closed position. For the sake of clarity, mat 43 has been omitted from this figure. As can be seen, the fully closed position of dies 19 and 22 does not involve actual contact between them. Narrow clearances remain.

Figure 4:
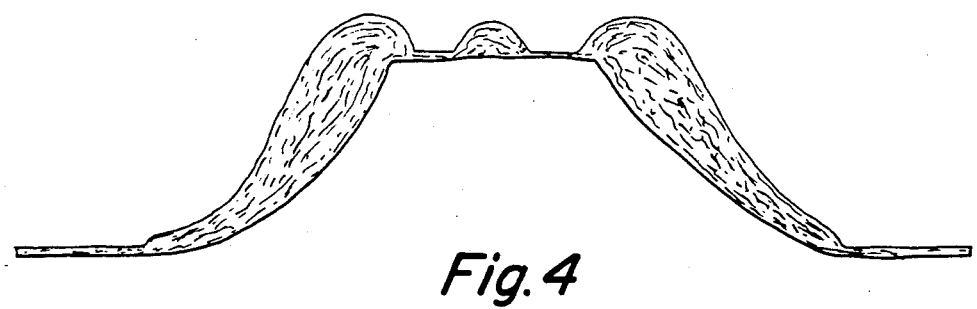
FIG. 4 is a sectional view, enlarged still further, of the contoured insulating shelf produced from the mat shown in FIGS. 1 and 2.

FIG. 4 shows a cross-sectional view of a finished insulating sheet made using the apparatus illustrated in FIGS. 1-3. As stated above, this particular sheet is designed for use as a sound and heat insulator over the transmission tunnel in a van. It is installed inside the van, between the floor and the carpet.

Figure 5:
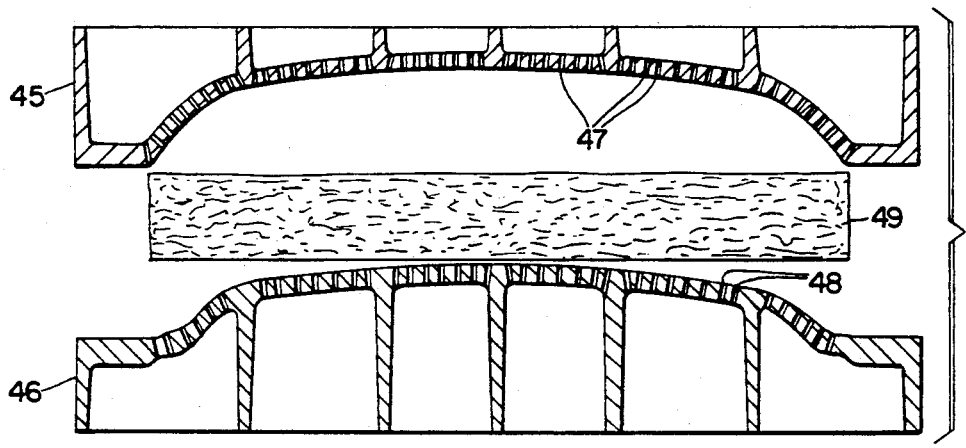
FIG. 5 is a schematic view of another set of dies, with a fiberglass mat between, used to form an automobile headliner.
Figure 6:
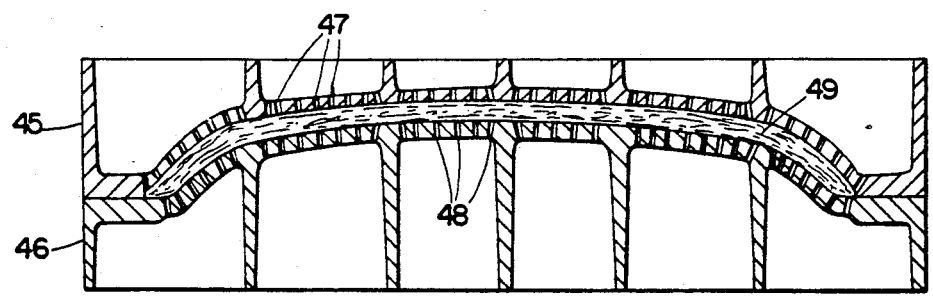
FIG. 6 is a schematic view of the die set and mat shown in FIG. 5, but with the dies fully closed.
Figure 7:
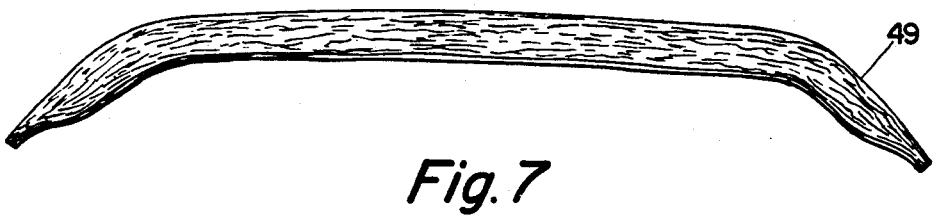
FIG. 7 is a slightly enlarged view of the finished headliner prepared as shown in FIGS. 5 and 6.

The apparatus shown in FIGS. 5 and 6 consists of a top forming tool 45 and a bottom forming tool 46. Substantially the entire contact surfaces of both tools are perforated with holes 47 and 48. Both tools are provided with means (not shown) for preheating them and means (not shown) for ejecting superheated steam through their perforations. Bottom tool 46 is also equipped with means (not shown) to pull a vacuum through the perforations. FIG. 5 shows forming tools 45 and 46 separated, with a mat 49 of uncured, resin-impregnated glass fibers in position to be compressed. FIG. 6 shows forming tools 45 and 46 in their closed position, with fiberglass mat 49 compressed between them. FIG. 7 depicts the finished automobile headliner 49 prepared by the process of FIGS. 5 and 6.

As shown in FIG. 5, the uncompressed fiberglass mat 49 has a thickness of approximately 1¾ inches. It measures approximately 60 inches wide by 110 inches long, and it has a density of approximately 2 lb./sq. yd. It is impregnated with an uncured phenol-formaldehyde resin. The finished headliner, shown in FIG. 7, is a rigid, hard shell having a thickness of about ⅛ to ⅜ inch in the center, which tapers at the edges to about ⅛ to 3/16 inch.

EXAMPLE 1

One example of the process conditions for preparing the headliner according to FIGS. 5-7 is as follows:

| Time Into the Cycle | Action/Conditions |
|---|---|
| 0 sec: | Preheat both dies (or "tools") to a contact surface temperature of approximately 375° F., using electrical resistance heaters. Place the unheated mat on the bottom die. To begin the cycle, commence ejecting superheated steam through the bottom tool. The temperature and pressure of the steam on the upstream side of the value (not shown) that supplies the tool are about 600° F. and 80 psig. (The steam has been produced in an 80 psig boiler (which operates at a temperature of about 325° F.) and then heated in a superheater (not shown) to raise its temperature another 275 Fahrenheit degrees.) Continue bottom tool steam ejection until 25 seconds into the cycle. Keep electric heaters on throughout the process. Begin gradually and constantly lowering top tool so that it requires 30 seconds to reach its completely lowered position. |
| 2 sec: | The moving upper die makes first contact with the fiberglass mat. Commence ejecting superheated steam at the same temperature and pressure through the top tool as well. Continue top tool steam ejection until 30 seconds into the cycle. |
| 25 sec: | Cease steam ejection through bottom tool and commence pulling vacuum of about 850 cubic feet per minute on bottom tool. |
| 30 sec: | Upper tool is fully lowered. Cease steam ejection through top tool and shut off vacuum |

| Time Into the Cycle | Action/Conditions |
|---|---|
| | to lower tool. Adhesive is now set. Raise top tool and remove contoured sheet. |

EXAMPLE 2

This is an alternative method of forming an automotive vehicle headliner from a 1¾ inch thick thermoformable mat of resinated fiberglass. The adhesive is a phenol-formaldehyde heat setting resin with an activation temperature in the range of 325°-350° F.

Top and bottom tool temperatures are electrically heated to a set point of 350° F. and are controlled to a tolerance of approximately + or − 10 Fahrenheit degrees. The superheated steam, as measured on the upstream side of the valve supplying the tool, is at 550° F. and 80 psig (i.e., it has been superheated to about 225 Fahrenheit degrees above its saturation temperature).

| Time Into the Cycle | Action/Conditions |
|---|---|
| 0-3 sec: | With the unheated mat lying horizontally on the bottom tool, the tools are gradually moved close enough together that the top tool contacts the mat and lightly presses against it. Then the tools are held in this position. |
| 0-35 sec: | Superheated steam is ejected from the bottom tool during this entire period, then is turned off. |
| 8-35 sec: | A low vacuum is pulled on the top tool during this period, then is turned off. The volume of the vacuum does not exceed the volume of the steam being ejected from the bottom tool. |
| 35-40 sec: | The tools are gradually moved closer together until they are fully closed, thus compressing the mat to its final shape and thickness. |
| 40-43 sec: | The tools are held in the fully closed position (no steam and no vacuum) as the resin sets. |
| 43 sec: | A vent valve (not shown) is opened on the top tool to allow ambient air through the die perforations and into the mat. The vent is left open through the remainder of the cycle. |
| 43-47 sec: | High volume vacuum is pulled on the bottom tool to draw air through the top tool and the edges of the mat and cool the part for operator comfort. At the same time, the tools are gradually moved fully apart. |
| 47 sec: | The finished part is removed from between the tools. |

EXAMPLE 3

This example illustrates a cycle for thermoforming a denser mat than that used in Examples 1 and 2, e.g., one made of shoddy in which the adhesive is again a thermosettable phenol-formaldehyde resin having a cure temperature in the range of about 325°-350° F. Tool temperature and steam temperature are the same as in Example 2. The mat is unheated when it is placed on the bottom tool.

| Time Into the Cycle | Action/Conditions |
|---|---|
| 0-3 sec: | The tools are gradually moved close enough together that the top tool only slightly presses against the mat, which is supported horizontally by the bottom tool; then the tools are held in this position. |
| 0-20 sec: | Superheated steam is ejected from the bottom tool throughout this period, then is turned off. Low vacuum is pulled on the top tool throughout this period, at a volume not exceeding the volume of the steam being ejected from the bottom tool, then is turned off. |
| 20-35 sec: | Superheated steam is ejected from the top tool throughout this period, then is turned off. Low vacuum is pulled on the bottom tool throughout this period, at a volume not exceeding the volume of the steam being ejected from the top tool, then is turned off. |
| 35-40 sec: | The tools are gradually moved closer together until they are fully closed, thus compressing the mat to its final shape and thickness. |
| 40-43 sec: | The tools are held in their fully closed position (no steam and no vacuum) as the phenol-formaldehyde resin sets. |
| 43 sec: | A vent valve is opened on the top tool and is left open through the remainder of the cycle. |
| 43-47 sec: | High volume vacuum is pulled through the bottom tool to draw air through the mat and cool the part for operator comfort. |
| 43-47 sec: | The tools are gradually moved fully apart. |
| 47 sec: | The finished sheet is removed from between the tools. |

EXAMPLE 4

This example illustrates the thermoforming of a ¾ inch thick thermoformable mat composed of an open cell polyurethane foam (Recticel SRTF 35D, made in Belgium). The mat is semi-rigid. It contains no adhesive. Its thermo-forming temperature is approximately 275° F. It is to be used to make an automobile headliner. Pre-applied to both sides of the foam is a powdered polyamide adhesive (Atochem H005) having a melt point of approximately 250° F. The adhesive has a particle size in the range of about 300-500 microns. The foam is sandwiched between a thin layer of a porous, nonwoven (i.e., spun bond), polyester reinforcement material having a weight of 1.02 ounce per square yard, and a foam-backed decorative fabric. The foam backing of the fabric is an open cell polyurethane cushion foam only 0.090 inch thick. The fabric is a stretchable nylon. The same Atochem H005 adhesive is pre-applied to the foam backing of the fabric. The unheated, layered composition is placed atop the bottom, horizontal die, with the decorative fabric facing up. The process will thermoform the mat and laminate the backing and facing fabric to the mat in one operation, producing a finished headliner.

Both top and bottom tools are electrically heated and pre-set at 240° F. The superheated steam is at 600° F. and 80 psig. The chamber of the top tool is equipped with an air vent.

| Time Into the Cycle | Action/Conditions |
|---|---|
| 0-3 sec: | The tools are gradually moved close enough together that the top tool applies only slight pressure to the facing fabric. |
| 0-25 sec: | Superheated steam is ejected from the bottom tool throughout this period, then is turned off. |
| 3-25 sec: | Low vacuum is pulled on the top tool throughout this period, at a volume not exceeding the volume of the steam being ejected from the bottom tool, then is turned off. |
| 3-30 sec: | The tools are moved slowly, steadily together until (at 30 seconds into the cycle) they are |

-continued

| Time Into the Cycle | Action/Conditions |
|---|---|
| | fully closed against the workpiece. compressing it to a thickness ranging from 3/16 inch at the edges to ¾ inch (i.e., no compacting) in the center. |
| 25–30 sec: | Superheated steam is ejected from the top tool throughout this period, then is turned off. Low vacuum is pulled on the bottom tool throughout this period, at a volume not exceeding the volume of the steam being ejected from the top tool, then is turned off. |
| 30–40 sec: | The tools are held in the fully closed position. |
| 30 sec: | Air vent on the top tool is opened and is left open through the remainder of the cycle. |
| 30–45 sec: | High volume vacuum is pulled on the bottom tool, drawing ambient air through the top tool and the workpiece, then is turned off. |
| 40–45 sec: | The tools are gradually moved fully apart. |
| 45 sec: | The finished headliner is removed from between the tools. |

I claim:

1. A process of forming a porous, thermoformable mat into a desired shape and making the mat less flexible and resilient comprising the following steps:

a) placing a porous thermoformable mat which can be formed and made less flexible and resilient by being heated under pressure to its thermoforming temperature between a pair of complementary, contoured dies, which, when brought fully together, define in a space between them a desired shape of the formed mat, each of said dies having a perforated contact surface and an enclosed chamber behind said contact surface, both said dies being preheated to an elevated temperature;

b) introducing superheated steam under pressure through a supply valve into the chamber of said first die while said mat is between said dies, so that the steam passes through the perforations in the first die's contact surface and penetrates the mat, the pressure of the steam on the upstream side of the supply valve being at least about 30 psig, the temperature of the steam being high enough to heat the mat to its thermoforming temperature, and applying a vacuum to the chamber in the second die while the superheated steam is introduced to the chamber in the first die, so as to help pull the steam through the mat, the volume of said vacuum not substantially exceeding the volume of the steam introduced to the chamber in the first die;

c) bringing the dies fully together, thereby compressing the mat between the dies, said compressing occurring while the mat is at its thermoforming temperature;

d) halting the steam introduction;

e) maintaining the die compression on said mat until the mat is substantially completely thermoformed into the desired shape;

f) separating said dies after the mat is substantially completely thermoformed; and g) removing the mat from between said dies.

2. A process of forming into a desired shape and making less flexible and resilient a porous, thermoformable mat comprised of substrate material intermixed with a heat activatable adhesive that is capable, upon being activated and then set, of holding the substrate material in a contoured shape and making the mat less flexible and resilient, comprising the following steps:

a) placing the mat between a pair of complementary, contoured dies which, when brought fully together, define in a space between them a desired shape of the formed mat, each of said dies having a perforated contact surface and an enclosed chamber behind said contact surface, both said dies being preheated to an elevated temperature;

b) introducing superheated steam under pressure through a supply valve into the chamber of said first die while said mat is between said dies, so that the steam passes through the perforations in the first die's contact surface and penetrates the mat, the pressure of said steam on the upstream side of the supply valve being at least about 30 psig, the temperature of the steam being high enough to heat the adhesive to its activation temperature, and applying a vacuum to the chamber in the second die while the superheated steam is introduced to the chamber in the first die, so as to help pull the steam through the mat, the volume of said vacuum not substantially exceeding the volume of the steam introduced to the chamber in the first die;

c) bringing the dies fully together, thereby compressing the mat between the dies, said compressing occurring while the adhesive is at activation temperature and commencing before the adhesive has set;

d) halting the steam introduction;

e) maintaining the die compression on said mat until the adhesive is substantially set;

f) separating said dies after the adhesive is substantially set; and g) removing the mat from between said dies.

3. The process of claim 2 wherein, during step (e), a cooling gas is passed through the mat.

4. The process of claim 3 wherein the cooling gas is ambient air.

5. The process of claim 2 wherein, during step (e), at least a portion of the mat is exposed to the ambient air and a vacuum is applied to the chamber in at least one of the dies, so as to pull ambient air through the mat, thereby cooling it.

6. The process of claim 4 wherein the adhesive is a thermosettable adhesive.

7. The process of claim 6, wherein, in step (b), on the upstream side of the supply valve the steam is at a pressure of about 30 to 90 psig and a temperature at least about 100 Fahrenheit degrees higher than the saturation temperature corresponding to the pressure of the steam.

8. The process of claim 7 wherein, in step (b), only undiluted superheated steam is introduced to the die chamber, and the temperature of the steam, when on the upstream side of the supply valve, is at least about 100 Fahrenheit degrees higher than the temperature at which the adhesive will become thermoset.

9. The process of claim 8 wherein the adhesive will become thermoset at a temperature somewhere in the range of about 180° to 375° F. and, in step (a), each die is preheated to a temperature within approximately 25 Fahrenheit degrees of the temperature at which the adhesive will become thermoset.

10. The process of claim 9 wherein, in step (b), on the upstream side of the supply valve the steam is at a pressure of about 40 to 90 psig.

11. The process of claim 10 wherein, in step (b), on the upstream side of the supply valve the steam is at a pressure of about 75 to 90 psig.

12. The process of claim 11 wherein the substrate material is fibrous.

13. The process of claim 12 wherein the substrate material comprises randomly oriented glass fibers and the mat, prior to being thermoformed by the process, has a substantially uniform thickness.

14. The process of claim 13 wherein the adhesive comprises a phenol-formaldehyde resin.

15. The process of claim 14 wherein, in step (b), after the steam has been introduced to the first die for a time, the direction of steam flow through the mat is reversed by applying a vacuum to the first die and introducing undiluted superheated steam through a supply valve to the chamber in the second die, said steam, on the upstream side of the supply valve, also being at a pressure of about 40 to 90 psig and a temperature that is (i) at least about 100 Fahrenheit degrees higher than the saturation temperature corresponding to the pressure of the steam and (ii) at least about 100 Fahrenheit degrees higher than the temperature at which the adhesive will become thermoset, the volume of said vacuum pulled on the first die not exceeding the volume of the steam introduced to the chamber of the second die.

16. The process of claim 15 wherein, in step (b), on the upstream side of the supply valve the steam is at a pressure of about 75 to 90 psig.

17. The process of claim 14 wherein, during step (e), at least a portion of the mat is exposed to the ambient air and a vacuum is applied to the chamber in at least one of the dies, so as to pull ambient air through the mat, thereby cooling it.

18. The process of claim 16 wherein, during step (e), at least a portion of the mat is exposed to the ambient air and a vacuum is applied to the chamber in at least one of the dies, so as to pull ambient air through the mat, thereby cooling it.

19. The process of claim 1 wherein the substrate material comprises an open cell foam.

20. The process of claim 19 wherein, in step (b), after the steam has been introduced to the first die for a time, the direction of steam flow through the mat is reversed by applying a volume of vacuum to the first die and introducing a volume of undiluted superheated steam through a supply valve to the chamber in the second die, said steam, on the upstream side of the supply valve, also being at a pressure of about 40 to 90 psig and a temperature that is (i) at least about 100 Fahrenheit degrees higher than the saturation temperature corresponding to the pressure of the steam and (ii) at least about 100 Fahrenheit degrees higher than the temperature at which the adhesive will become thermoset, the volume of said vacuum pulled on the first die not exceeding the volume of the steam introduced to the chamber of the second die.

21. The process of claim 20 wherein, in step (b), on the upstream side of the supply valve the steam is at a pressure of about 75 to 90 psig.

22. The process of claim 21 wherein, during step (e), at least a portion of the mat is exposed to the ambient air and a vacuum is applied to the chamber in at least one of the dies, so as to pull ambient air through the mat, thereby cooling it.

23. The process of claim 10 wherein, in step (b), the dies are gradually brought together as the steam is being introduced to the chamber of said first die.

24. The process of claim 18 wherein, in step (b), the dies are gradually brought together as the steam is being introduced to the chamber of said first die.

25. The process of claim 22 wherein, in step (b), the dies are gradually brought together as the steam is being introduced to the chamber of said first die.

26. The process of claim 4 wherein the adhesive is thermoplastic and melts somewhere in the range of about 180° to 375° F. and, in step (a), the dies are preheated to a temperature below the melt point of the adhesive.

27. The process of claim 26 wherein, in step (b), on the upstream side of the supply valve the steam is at a pressure of about 30 to 90 psig and a temperature at least about 100 Fahrenheit degrees higher than the saturation temperature corresponding to the pressure of the steam.

28. The process of claim 27 wherein, during step (e), at least a portion of the mat is exposed to the ambient air and a vacuum is applied to the chamber in at least one of the dies, so as to pull ambient air through the mat, thereby cooling it.

29. The process of claim 28 wherein, in step (b), only undiluted superheated steam is introduced to the die chamber, and the temperature of the steam, on the upstream side of the supply valve, is at least about 100 Fahrenheit degrees higher than the melt point of the adhesive.

30. The process of claim 29 wherein each die is preheated to a temperature within approximately 50 Fahrenheit degrees of the melt point of the adhesive.

31. The process of claim 30 wherein, in step (b), on the upstream side of the supply valve the steam is at a pressure of about 40 to 90 psig.

32. The process of claim 31 wherein, in step (b), on the upstream side of the supply valve the steam is at a pressure of about 75 to 90 psig.

33. The process of claim 32 wherein the substrate material comprises one or more materials selected from the group consisting of fibrous materials and open cell foam.

34. The process of claim 33 wherein the mat, prior to being thermoformed by the process, has a substantially uniform thickness.

35. The process of claim 34 wherein the substrate material is open cell polyurethane foam and the adhesive is a polyamide resin.

36. The process of claim 35 wherein, in step (b), the dies are gradually brought together as the steam is being introduced to the chamber of said first die.

37. The process of claim 36 wherein, in step (b), after the steam has been introduced to the first die for a time, the direction of steam flow through the mat is reversed by applying a volume of vacuum to the first die and introducing a volume of undiluted superheated steam through a supply valve to the chamber in the second die, said steam, on the upstream side of the supply valve, also being at a pressure of about 40 to 90 psig and a temperature that is (i) at least about 100 Fahrenheit degrees higher than the saturation temperature of the steam at that pressure and (ii) at least about 100 Fahrenheit degrees higher than the melt point of the adhesive, the volume of said vacuum pulled on the first die not substantially exceeding the volume of the steam introduced to the chamber of the second die.

38. The process of claim 1 wherein, in step (a), the perforations in said contact surfaces have diameters in the range of about 0.035 to 0.065 inch and are spaced apart a distance not more than about ½ inch.

39. The process of claim 2 wherein, in step (a), the perforations in said contact surfaces have diameters in the range of about 0.035 to 0.065 inches and are spaced apart a distance not more than about ½ inch.

40. The process of claim 12 wherein, in step (a), the perforations in said contact surfaces have diameters in the range of about 0.035 to 0.065 inch and are spaced apart a distance not more than about ½ inch.

41. The process of claim 21 wherein, in step (a), the perforations in said contact surfaces have diameters in the range of about 0.0356 to 0.065 inch and are spaced apart a distance not more than about ½ inch.

42. The process of claim 25 wherein, in step (a), the perforations in said contact surfaces have diameters in the range of about 0.035 to 0.065 inch and are spaced apart a distance not more than about ½ inch.

43. The process of claim 34 wherein, in step (a), the perforations in said contact surfaces have diameters in the range of about 0.035 to 0.065 inch and are spaced apart a distance not more than about ½ inch.

44. The process of claim 37 wherein, in step (a), the perforations in said contact surfaces have diameters in the range of about 0.035 to 0.065 inch and are spaced apart a distance not more than about 178 inch.

* * * * *